(12) United States Patent
Dornan et al.

(10) Patent No.: US 7,221,373 B2
(45) Date of Patent: May 22, 2007

(54) COLOUR SPECIFICATION

(75) Inventors: Robert Dornan, Strathclyde (GB);
Anthony Edward Durnian, Strathclyde (GB)

(73) Assignee: J & P Coats Limited, Glasgow, Strathclyde (GB)

( * ) Notice: Subject to any disclaimer, the term of this patent is extended or adjusted under 35 U.S.C. 154(b) by 0 days.

(21) Appl. No.: 10/240,804

(22) PCT Filed: Mar. 30, 2001

(86) PCT No.: PCT/GB01/01431

§ 371 (c)(1),
(2), (4) Date: Jun. 11, 2003

(87) PCT Pub. No.: WO01/75406

PCT Pub. Date: Oct. 11, 2001

(65) Prior Publication Data

US 2004/0008207 A1    Jan. 15, 2004

(30) Foreign Application Priority Data

Apr. 4, 2000  (GB)  ................................. 0008102.6

(51) Int. Cl.
*G09G 5/02*   (2006.01)
(52) U.S. Cl. ..................................................... 345/591
(58) Field of Classification Search ................ 345/589, 345/590, 591, 593; 382/167; 358/518, 1.9
See application file for complete search history.

(56) References Cited

U.S. PATENT DOCUMENTS

| 4,966,461 | A |   | 10/1990 | Hooper |
| 5,255,350 | A | * | 10/1993 | Hermann et al. ............ 358/1.9 |
| 5,428,720 | A |   | 6/1995  | Adams, Jr. |
| 5,854,882 | A | * | 12/1998 | Wang ......................... 358/1.9 |
| 5,943,059 | A | * | 8/1999  | Satoh et al. ................. 345/601 |
| 6,229,915 | B1| * | 5/2001  | Ohkubo ...................... 382/167 |

FOREIGN PATENT DOCUMENTS

GB      2 296 102 A      6/1996

OTHER PUBLICATIONS

X-Rite Incorporated. "A Guide To Understanding Color Communication". Jan. 2000. Available at http://www.bz.duke.edu/johnsenlab/pdfs/tech/colorcommunication.pdf. p. 15.*

Fred W. Billmeyer, Jr.: Survey or Color Order Systems; Aug. 1987; pp. 173-186; vol. 12, No. 4; John Wiley & Sons, Inc., New York, NY.

\* cited by examiner

*Primary Examiner*—Kee M. Tung
*Assistant Examiner*—Aaron M. Richer
(74) *Attorney, Agent, or Firm*—Alston & Bird LLP

(57) ABSTRACT

There is disclosed a method for preparing a color chart comprising the steps of defining a reference color, specifying a range of colors from said reference color, each color being spaced by integral multiples of a preselected color difference value from any other color, the range spanning the color space between the reference color and some other color.

2 Claims, 2 Drawing Sheets

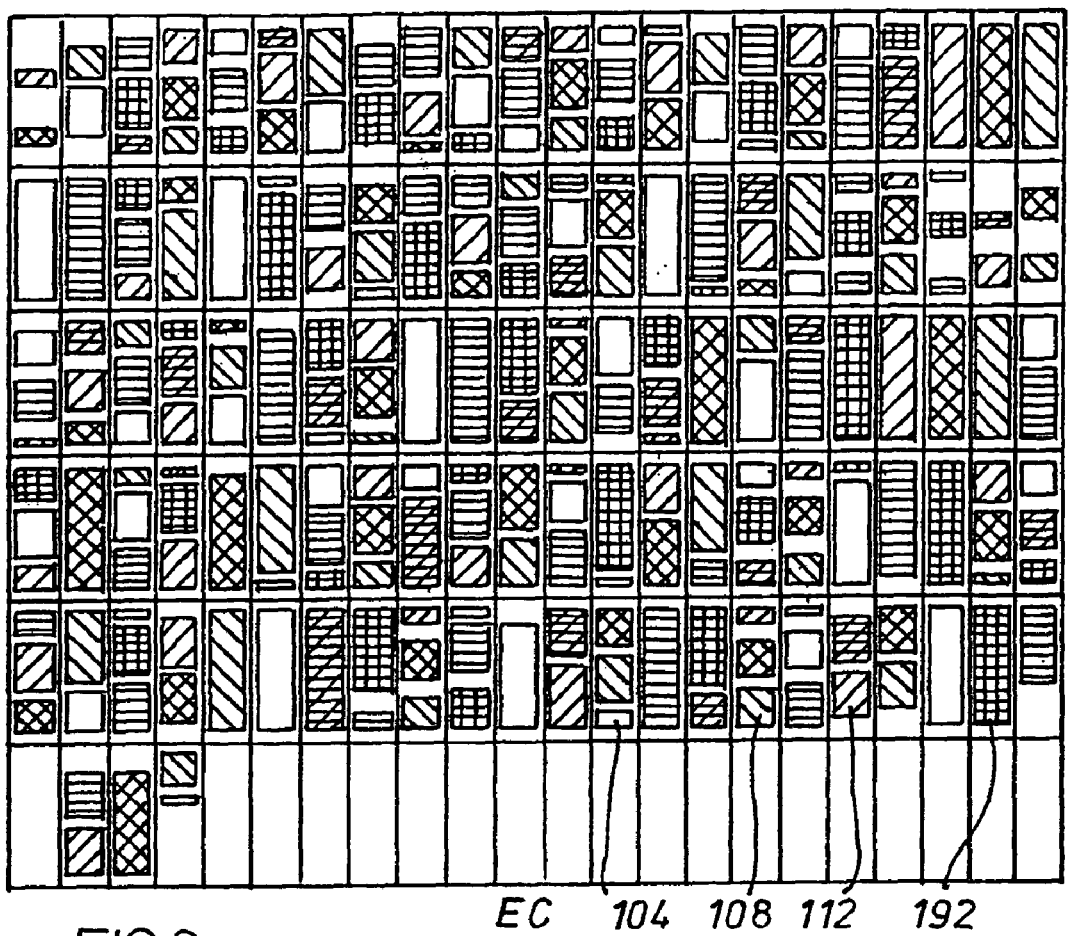
FIG.2    EC  104  108  112  192
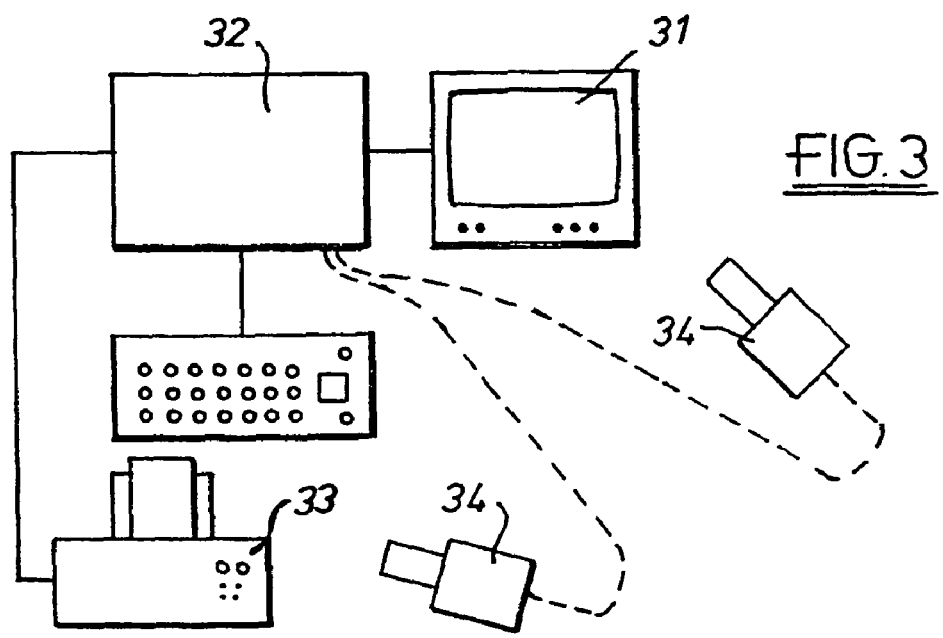
FIG.3

COLOUR SPECIFICATION

FIELD OF THE INVENTION

This invention relates to colour charts.

BACKGROUND OF THE INVENTION

Colour charts are prepared by manufacturers of paints, inks, dyestuffs and coloured products as diverse as motor vehicles and sewing threads. Usually, they are published as printed colours, laid out in some sort of array, on paper, but swatch cards are also produced by, for example, manufacturers of fabrics, laminates and so forth in which the colours are shown on the fabric or laminate itself. The colours are selected in accordance with the preferences of an individual or panel of people, perhaps after some market research, and assigned more or less fanciful names such as Nile Green or Dusky Peach. Disclaimers are often made as to the reproducibility of the chart colours, especially in regard to the differences brought about by application to the intended substrate as compared with the chart colour on its paper substrate.

Some colour charts, comprehensive enough to be termed 'colour libraries' are necessarily arranged in some kind of logical order. Among these may be mentioned the CIELAB colour model, and the Pantone, Scott Dic and Munsell systems. At least one of these libraries has been transferred from the physical samples to an electronic version in which the colours are stored as brightness, hue and chroma values for displaying a colour on a colour monitor. A problem with electronic representation, of course, can be appreciated by casual observation of television sets in a dealer's window—not all the sets will be showing the same colour, despite receiving the same signal.

A shortfall of all of these systems is that by no means all available colours are represented. Even though, typically, there may be some 1700 colours in such a library, manufacturers are not infrequently asked for 'specials', colours not represented by chart colours.

SUMMARY OF THE INVENTION

The present invention provides methods for preparing colour charts, colour charts prepared by such methods and apparatus for displaying colour charts and colours therefrom that do not suffer the disadvantages of prior art charts and their display and which have considerable advantages to those concerned with the specification or production of colour and coloured articles.

The invention comprises, in one aspect, a method for preparing a colour chart comprising the steps of
 defining a reference colour, and
 specifying a range of colours from said reference colour, each colour being spaced by integral multiples of a preselected colour difference value from any other colour, the range spanning the colour space between the reference colour and some other colour Typical colour difference values are CMC values. The preselected colour difference value may be at least one CMC value and may desirably be in the region of two CMC values.

A CMC value (as specified by the Colour Management Committee) is a trade-wide adopted standard for colour differentiation. It is defined as the difference, in CIE colour space, comprising differences in hue, chroma and lightness, between a specified and an achieved colour, as specified by the CMC formula. It renders numeric measures of colour difference which are generally accepted as being visually uniform i.e. the same magnitude of CMC value is the same colour difference irrespective of the colour.

Whilst it is possible to contemplate charts for green, red or other subsets of the entire gamut of colour, the invention is most meaningful when the whole gamut is covered. The reference colour, then, may be the deepest possible black, or the purest and brightest possible white.

This method of specifying colours fills the colour space extending from deepest black to brightest white, and encompassing red, green, yellow and blue, with approximately 17000 colours. There is little or no point in specifying finer differences than are commercially only just distinguishable. The number is larger—far larger than any other commercial colour chart—but manageable. Because of the structure of the chart, it lends itself to an orderly, objective, rather than subjective, identification of the colours. While many systems could be devised, a straightforward, easily understandable system is to label each colour with an alphanumeric code of the form AA123. The potential range of available code numbers is 676000, which is far larger than is required for the 17000 or so colours of the full chart, so there is perhaps, room for interpolation, should it for any reason be desired to add further colours. On this basis, jet black could be represented as AA000 and whitest white by ZA000.

The invention also comprises a colour chart comprising a range of colours specified for a defined reference colour each colour being spaced by integral multiples of a preselected colour difference value from any other colour, the range spanning the colour space between the reference colour and some other colour. The reference colours may be white, black, or, indeed any other colour and the range may comprise those colours in the colour space which are spaced from an adjacent colour by at least one CMC value, preferably by about two CMC values, e.g. 1.8 or 2.2 CMC values.

Of course, it would not be possible to make any meaningful colour chart for the whole of colour space on a single sheet of paper. Rather, sub-ranges can be indicated, using the labelling method outlined above, by the alpha part of the code on a segment of a circular colour map, and the chart proper can be on a page-by-page basis for colours represented by codes beginning AA, AB, AC, . . . BA, BB, BC, . . . ZA, ZY, ZZ.

Obviously, such a "chart" could run to 676 pages, and might be unmanageable for many purposes. The chart can, however, be represented digitally for display via a programmed computer on a colour monitor, and the invention also comprises apparatus for displaying a colour chart, comprising
 a colour video monitor, and
 a computer programmed to specify a range of colours extending from a defined reference colour each colour being spaced by integral multiples of a predetermined colour difference value from any other colour, the range spanning the colour space between the reference colour and some other colour
 the computer being connected to the monitor and controllable to display at least one colour of the range thereon.

Having regard to the problems of displaying colours alluded to above, it is preferred that the monitor is calibratable, both internally to itself and externally to the computer, so that the colour actually displayed corresponds to the specified colour. The monitor can be calibrated with reference to standard colours by means of a colorimeter. Rather than resort to the usual colour adjustments available on colour monitors, it may be that the colour signals sent between the computer and the monitor are adjusted (the adjustments being, for example, stored in a database which is consulted each time a colour signal is transmitted) by means of a feedback from the colorimeter.

In much the same way, a colour printer can be calibrated to print colours which match the screen colours or a set of standard colours.

While the measures described above can be used to produce a colour chart and to display its colours accurately on screen or printed on to paper, there remains the problem of producing the finished product, be it a textile product, a ceramic, a leather, a laminate or whatever, which involves the production of an appropriate colorant which it will perfom on the substrate to which is will be applied. Textile dyestuffs, for example, will yield different colours on different substrates, for example, substrates having different textures. This problem can also be addressed in conjunction with the invention.

In another aspect, then, the invention comprises apparatus as aforesaid in which the computer contains a database of colour recipes from which a particular recipe is desired representative of a colour displayed on the monitor which will produce the actual colour when applied to a particular substrate. The database will contain different recipes for the same colour but for application to different substrates. The recipes may be in digital format which, for a perfect screen, would display the called-for colour, and the machine contain programming modifying the instructions to the screen (or printer, as the case may be) to produce the colour called for. The programming may include an algorithm, which will be a method of working out a recipe for example for paints, inks and/or dyes. The computer, in other words, may include programming adapted to modify the instructions on the basis of a different substrate, as outlined above.

BRIEF DESCRIPTION OF THE DRAWINGS

The invention will now be described with reference to the drawings, in which:

FIG. 2 is of an example of a page of colours from a colour index prepared according to the invention; and FIG. 3 is a diagrammatic illustration of apparatus useful in connection with the preparation and display of colours in a colour chart according to the invention.

DETAILED DESCRIPTION OF PREFERRED EMBODIMENTS

Figure 1:
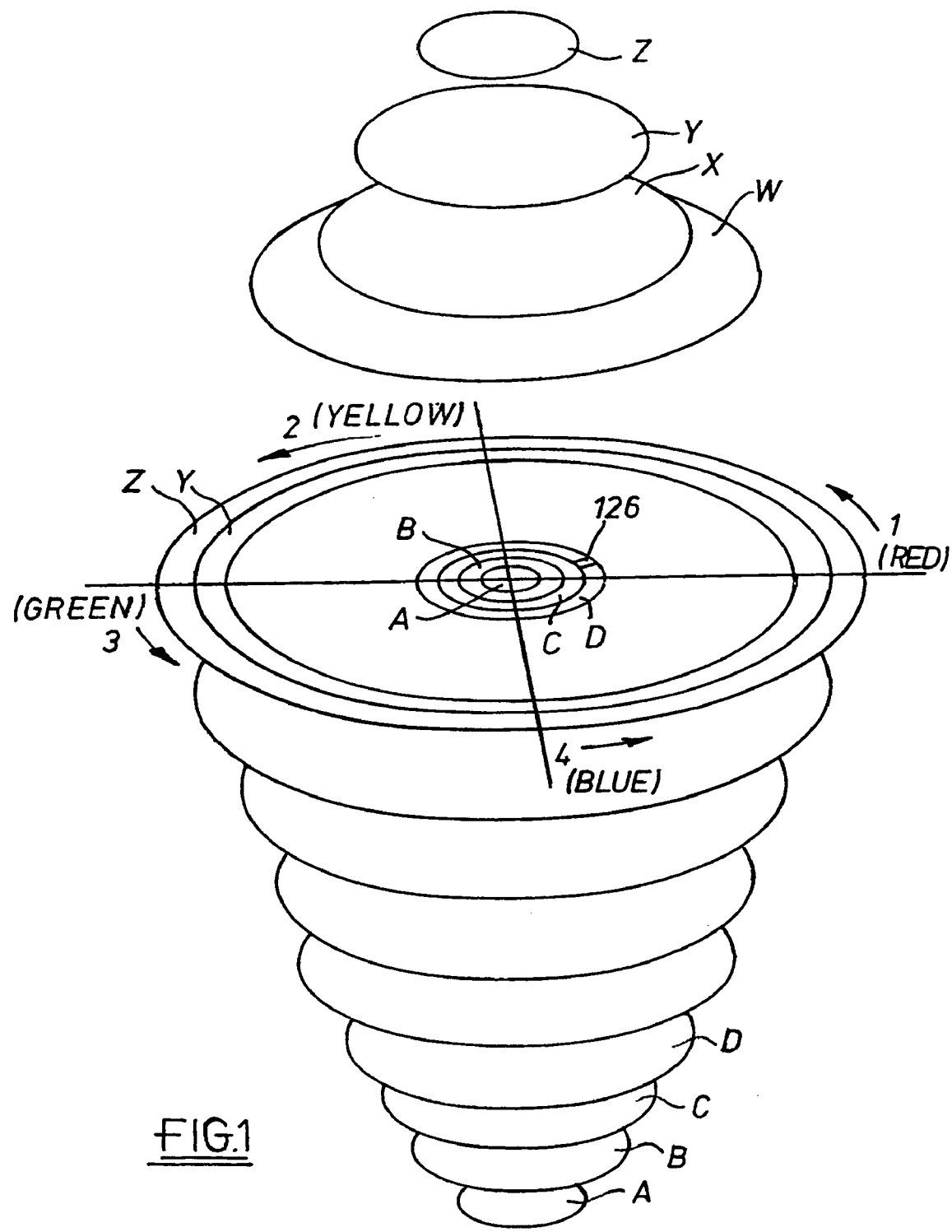
FIG. 1 is a colour map such as might be used in connection with the invention.

The drawings illustrate a method for preparing a colour chart 11 comprising the steps of defining a reference colour, eg black (AA000, FIG. 1) or white (ZA000, FIG. 1) and specifying a range of colours from said reference colour (AA000 or ZA000), each colour being spaced by integral multiples of a preselected colour difference value from any other colour, the range spanning the colour space between the reference colours and some other colour.

The colour difference values are CMC values.

FIG. 1 illustrates the coding system. The first letter of the code is an indication of lightness, A being dark, Z being bright, a letter late in the alphabet indicating a lighter colour than a letter earlier in the alphabet.

The lightness/darkness spectrum is depicted in planes A, B, . . . Y, Z.

The second letter denotes to chroma circle, A denoting the "bull's eye", B, D . . . Z denoting the first, second etc circles outside this, a letter later in the alphabet denoting a less intense shade than one earlier in the alphabet.

The first numeric digit denotes which of the four quadrants the colour appears in, quadrant 1 extending from red to yellow (thereby encompassing orange shades) quadrant 2 extending from yellow to green, quadrant three from green to blue, and quadrant 4 from blue, through purples, back to red.

The next two digits represent the distance around the colour circle from the beginning of the quadrant. Thus 126 represents the twenty sixth point around the first quadrant, thus a reddish orange colour. The full coding BD126 thus represents a point on circle D in the second lightness plane, 26 points around the circle from the beginning of quadrant 1, thus a dark, intense reddish orange colour.

With a little experience, any colour denoted by this coding in the form xxnnn can be fairly readily visualised.

FIG. 2 shows a typical page from a compendium of all colours of a colour chart according to the invention. The page, selected, as it were, at random from all the pages labelled AA to ZA, is page EC and contains 25 colours, EC100, EC108, EC106, . . . EC192. EC196. Other pages will be similar. Of course, other configurations can be adopted. The pages can be pages of a paper publication or 'pages' of text and graphics in a computer.

Of course, different coding systems can be adopted, but the one particularly herein described appears well suited for adoption as a standard.

FIG. 3 illustrates apparatus for displaying a colour chart comprising a colour video monitor 31 and a computer 32 programmed to specify a range of colours between to reference colours each colour being spaced by an integral multiple of two CMC values from any other colour, the range: spanning the colour space between the two reference colours, and the computer 32 being connected to the monitor and controllable to display at least one colour of the range thereon.

A colour printer 33 is also connected to the computer 32—inasmuch as a printer is essentially a printing VDU, although not so fast in response nor so flexible in operation as a VDU—the colour printer 33 is auxiliary to the video monitor 31. Provision for internal calibration is desirable so that it may be ensured that signals passed to the monitor or printer from the computer always result in the same colour being displayed or printed.

Likewise, adjustment may be made for changes in the appearance of a colour when it is applied to different substrates. This may be done exactly as described, namely by comparing the screen or printed image with a colour on a particular substrate, or the effect of colorants such as dyestuffs on different substrates such as woven or knitted fabrics, fabrics which have and fabrics which have not been bleached, and so on, can be taken into consideration in a database loaded into the computer and consulted when a dye recipe, for example, for dyeing onto ecru cotton fabric is required.

The invention claimed is:

1. A method for preparing a colour chart, comprising the steps of:

defining a first colour as one of black and white, the first colour having a first lightness value;

defining a second colour as the other of black and white, the second colour having a second lightness value;

defining a plurality of intermediate lightness values at predetermined intervals of lightness value between the first and second lightness values;

defining a plurality of chroma circles at each of the intermediate lightness values, each chroma circle spanning a range of chroma values representing chromas from red to yellow to green to blue and back to red, the chroma circles at each lightness value differing from one another in hue value;

populating a colour space between the first colour and the second colour by specifying a plurality of colours at each of the intermediate lightness values, wherein there are a plurality of colours for each chroma circle at each of the intermediate lightness values, the colours being specified such that each colour in the colour space is spaced from any other colour in the colour space by integral multiples of a preselected colour difference value comprising predetermined CMC values; and displaying at least one of said plurality of colours in a form that can be visually perceived by a user.

2. The method of claim 1, further comprising the step of defining a system for naming the colours in the colour space, wherein each of the lightness values is given a unique lightness designator, each of the chroma circles at each lightness value is given a unique hue designator, and each of the colours for each chroma circle is given a unique chroma designator.

* * * * *